United States Patent
Bartlett et al.

(10) Patent No.: US 10,238,131 B2
(45) Date of Patent: Mar. 26, 2019

(54) SYSTEM, DEVICE, AND METHOD FOR PRESERVATIVE CONCENTRATION CONTROL IN BAKING PRODUCTION

(71) Applicant: Premier Innovations, LLC, Austin, TX (US)

(72) Inventors: Brian E. Bartlett, Austin, TX (US); Douglas W. Cotton, Katy, TX (US)

( * ) Notice: Subject to any disclaimer, the term of this patent is extended or adjusted under 35 U.S.C. 154(b) by 100 days.

(21) Appl. No.: 15/231,217

(22) Filed: Aug. 8, 2016

(65) Prior Publication Data

US 2018/0035696 A1 Feb. 8, 2018

(51) Int. Cl.

| | |
|---|---|
| A21C 1/14 | (2006.01) |
| A23L 3/34 | (2006.01) |
| A21C 14/00 | (2006.01) |
| A23L 3/358 | (2006.01) |
| A23L 3/3454 | (2006.01) |
| A23L 3/3463 | (2006.01) |
| A23L 3/3589 | (2006.01) |

(52) U.S. Cl.
CPC .......... *A23L 3/3454* (2013.01); *A21C 1/146* (2013.01); *A21C 1/1425* (2013.01); *A21C 1/1435* (2013.01); *A21C 14/00* (2013.01); *A23L 3/34* (2013.01); *A23L 3/3463* (2013.01); *A23L 3/358* (2013.01); *A23L 3/3589* (2013.01)

(58) Field of Classification Search
CPC ..... A21C 1/1425; A21C 1/1435; A21C 1/142; A21C 1/145; A21C 1/1455; A21C 1/146; A21C 14/00; A23L 3/3454; A21D 13/0074; A23V 2002/00
See application file for complete search history.

(56) References Cited

U.S. PATENT DOCUMENTS

| | | | | |
|---|---|---|---|---|
| 1,790,347 A | * | 1/1931 | Hawkins ............... | A21C 1/003 |
| | | | | 134/198 |
| 2,792,304 A | * | 5/1957 | Pavan ................... | A21C 1/06 |
| | | | | 366/139 |

(Continued)

FOREIGN PATENT DOCUMENTS

| | | | | |
|---|---|---|---|---|
| EP | 1714556 A2 | * | 10/2006 | ............... A21C 1/02 |
| FR | 2759863 A1 | * | 8/1998 | ........... A21C 1/1425 |

(Continued)

*Primary Examiner* — Charles Cooley
(74) *Attorney, Agent, or Firm* — Olav M. Underdal; IDP Patent Services

(57) ABSTRACT

A baking production system for control of preservative concentration during production of baked products includes a preservative control system, including a preservative control unit, a flow control valve, a flow meter, first and second conductive probes, first and second acidity sensors, a metering pump, a water mixer, a temperature sensor, a moisture sensor, which is configured to mix the water with the preservative solution, thereby creating a water preservative mixture; and a production line, including a dough mixer, which is configured to receive a baking mixture and mix the baking mixture with the water preservative mixture, thereby creating a dough. Also disclosed is a method for preservative concentration control, including calculating water preservative concentration, optimizing preservative solution flow, calculating dough preservative concentration, and optimizing source water flow.

22 Claims, 4 Drawing Sheets

(56) References Cited

U.S. PATENT DOCUMENTS

| | | | |
|---|---|---|---|
| 4,490,046 A * | 12/1984 | Guibert | B01F 7/24 |
| | | | 366/297 |
| 4,513,018 A | 4/1985 | Rubio | |
| 4,978,548 A | 12/1990 | Cope et al. | |
| 5,155,558 A | 10/1992 | Tannenbaum et al. | |
| 5,215,251 A * | 6/1993 | Volk, Jr. | A21C 1/1435 |
| | | | 137/607 |
| 5,298,274 A | 3/1994 | Khalsa | |
| 5,399,367 A | 3/1995 | Mattson | |
| 5,400,704 A | 3/1995 | Huston | |
| 5,539,213 A | 7/1996 | Meeks et al. | |
| 5,554,405 A | 9/1996 | Fazzolare et al. | |
| 5,652,010 A | 7/1997 | Gimmler et al. | |
| 5,918,533 A | 7/1999 | Lawrence et al. | |
| 6,001,409 A | 12/1999 | Gimmler et al. | |
| 6,491,959 B1 | 12/2002 | Chiang et al. | |
| 6,572,910 B2 | 6/2003 | Lanner et al. | |
| 6,811,293 B1 * | 11/2004 | Roquemore | A21C 1/083 |
| | | | 366/153.2 |
| 6,830,767 B2 | 12/2004 | Teras et al. | |
| 7,036,535 B1 * | 5/2006 | Chandler | A21C 1/02 |
| | | | 141/82 |
| 8,974,110 B2 * | 3/2015 | Matsuda | A21C 1/003 |
| | | | 366/147 |
| 9,492,801 B2 * | 11/2016 | Vesala | B01F 7/00908 |
| 10,035,117 B2 * | 7/2018 | Harboe | B29B 7/7457 |
| 2012/0192721 A1 | 8/2012 | Gonzalez | |
| 2018/0035696 A1 * | 2/2018 | Bartlett | A23L 3/3454 |

FOREIGN PATENT DOCUMENTS

| | | | | |
|---|---|---|---|---|
| GB | 539592 A * | 9/1941 | | A21C 1/145 |
| WO | WO-2010045930 A2 * | 4/2010 | | A21C 1/02 |

* cited by examiner

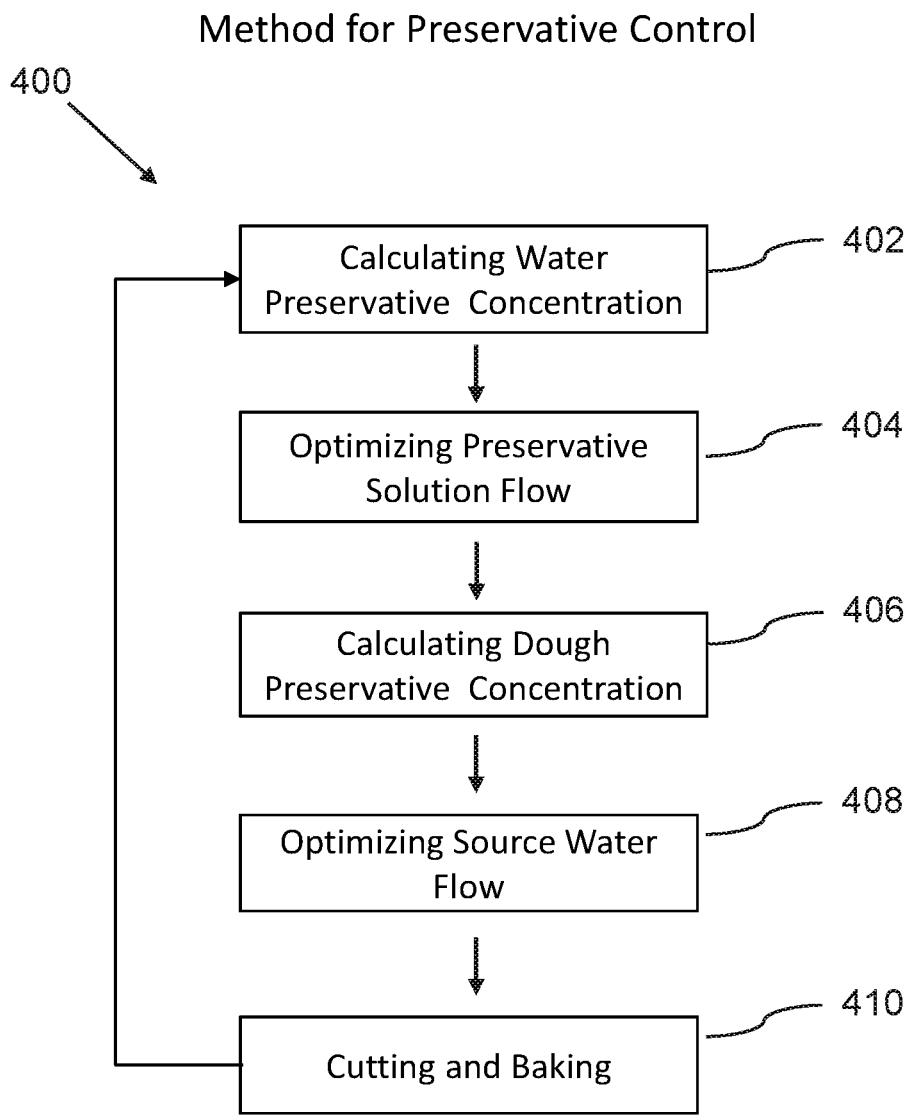

SYSTEM, DEVICE, AND METHOD FOR PRESERVATIVE CONCENTRATION CONTROL IN BAKING PRODUCTION

CROSS-REFERENCE TO RELATED APPLICATIONS

N/A

FIELD OF THE INVENTION

The present invention relates generally to the field of baking production, and more particularly to methods and systems for controlling concentration of preservative during production of baked food products.

BACKGROUND OF THE INVENTION

A variety of standardized designs have been developed for production lines used in industrial food production of baked products, such as tortillas. A preservatives mixture is added to the dough or masa used for sheeting/forming products prior to baking. If the concentration of preservative is too small, the finished baked product will develop mold. If the concentration is too high, the taste will be affected. Currently poor control of the amount of preservative is routinely responsible for unusable product or product developing mold before the listed expiration date.

Thus, despite development in design of production lines, it remains very difficult to control the concentration of preservatives in finished tortillas, and other baked products.

As such, considering the foregoing, it may be appreciated that there continues to be a need for novel and improved devices and methods for controlling concentration of preservatives during baking of tortillas, and other food products.

SUMMARY OF THE INVENTION

The foregoing needs are met, to a great extent, by the present invention, wherein in aspects of this invention, enhancements are provided to the existing models for controlling concentration of preservatives during baking of tortillas, and other food products.

In an aspect, a baking production system for control of preservative concentration during production of baked products can include:
a) a preservative control system, which can be configured to control mixing of water from a water source with a preservative solution, thereby creating a water preservative mixture; the preservative control system comprising:
  a water mixer, which is configured to mix the water with the preservative solution, thereby creating a water preservative mixture;
b) a production line, comprising:
  a mixer, which is configured to receive a baking mixture and mix the baking mixture with the water preservative mixture, thereby creating a dough.

In a related aspect, the preservative solution can be selected from the group consisting of propionic acid; benzoic acid; phosphoric acid; other preservatives; and combinations thereof.

In another related aspect, the preservative control system can further include:
a) a preservative control unit;
b) a flow control valve, which is configured to be connected to an external water source that provides a flow of source water, such that the flow control valve is configured to regulate a source water flow of the source water based on a control signal from the preservative control unit;
c) a flow meter, which is connected to output from the flow control valve, such that the flow meter measures an actual water flow in the water flow line;
d) a first conductive probe, which is configured to measure a conductivity of the source water in communication with the preservative control unit;
e) a first pH Sensor, which is configured to measure an acidity of the source water in communication with the preservative control unit;
f) a metering pump, which is configured to pump a preservative solution via a preservative flow line, such that the preservative control unit is connected to the metering pump, such that the preservative control unit is configured to control a preservative flow of the preservative solution;
g) a water mixer, which is in fluid connection with the water flow and preservative flow lines, such that the water mixer is configured to mix the source water with the preservative solution, thereby forming a flow of mixed water; and
h) a second conductive probe, which is configured to measure a conductivity of the mixed water in communication with the preservative control unit; and;
i) a temperature sensor, which is configured to measure a temperature of the mixed water in communication with the preservative control unit;
j) a second pH Sensor, which is configured to measure an acidity of the mixed water in communication with the preservative control unit; and
k) a moisture sensor, which is configured to measure a moisture of the dough in communication with the preservative control unit.

In yet a related aspect, the preservative control system further comprises:
a) a processor;
b) a non-transitory memory;
c) an input/output component;
d) a water controller, which can be configured to control the flow of source water by regulating the flow metering pump;
e) a preservative controller, which can be configured to control the flow of preservative solution by regulating the flow control valve;
f) a preservative manager, which can be configured to regulate a content of preservative in a dough, by:
  regulating a flow of preservative in communication with a preservative controller; and
  regulating a flow of water in communication with the water controller;
g) a conductivity monitor, which can be configured to measure a conductivity of the source water in communication with the first conductive probe and measure a conductivity of the mixed water in communication with the second conductive probe; and
h) a moisture monitor, which can be configured to measure a moisture content of the dough in communication with the moisture sensor;
i) A temperature monitor, which can be configured to measure a temperature of the mixed water in communication with the temperature sensor; and j) A pH monitor, which can be configured to measure a pH of the source water in communication with the pH sensor #1 and a pH of the mixed water in communication with the pH sensor #2; all connected via
k) a data bus.

In yet a related aspect, the preservative manager can configured to calculate a preservative concentration of the water preservative mixture by performing a differential calculation to determine a concentration of preservative in the mixed water, which is based on a calculation of the difference between measurements of a first conductivity of the source water and a second conductivity of the mixed water.

In a yet further related aspect, the differential calculation can be enhanced to compensate for temperature.

In a yet further related aspect, the differential calculation can be enhanced to compensate for pH (i.e. acidity/alkalinity).

In another related aspect, the preservative manager can be configured to calculate a preservative concentration of the water preservative mixture by performing a differential calculation to determine a concentration of preservative in the mixed water, which is based on a calculation of the difference between measurements of a first acidity of the source water and a second acidity of the mixed water.

In yet a related aspect, the preservative manager can be further configured to execute a first control loop feedback calculation to optimize the flow of preservative solution to reach a predetermined preservative target for preservative concentration of the mixed water.

In a related aspect, the preservative manager can be configured to calculate a preservative concentration of the dough by executing a concentration calculation to determine a concentration of preservative of the dough, as a function of the concentration of preservative in the mixed water and a moisture of the dough, wherein the moisture of the dough is obtained in communication with the moisture sensor.

In another a related aspect, the preservative manager can be further configured to execute a second control loop feedback calculation to optimize the flow of the source water to reach a predetermined moisture target for moisture of the dough.

In an aspect, a method for preservative concentration control for use during baking can include:
  a) calculating water preservative concentration, comprising calculating a preservative concentration of the water preservative mixture by performing a differential calculation to determine a concentration of preservative in the mixed water, as a function of measurements of a first conductivity of the source water and a second conductivity of the mixed water;
  b) optimizing preservative solution flow, comprising executing a first control loop feedback calculation to optimize the flow of preservative solution to reach a predetermined preservative target for preservative concentration of the mixed water;
  c) calculating dough preservative concentration, comprising calculating a preservative concentration of the dough by performing a concentration calculation to determine a concentration of preservative of the dough, as a function of the concentration of preservative in the mixed water and a moisture of the dough; and
  d) optimizing source water flow, comprising executing a second control loop feedback calculation to optimize the flow of the source water to reach a predetermined moisture target for moisture of the dough.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 is a flowchart illustrating steps that may be followed, in accordance with one embodiment of a method or process of preservative control.

DETAILED DESCRIPTION

Figure 1:
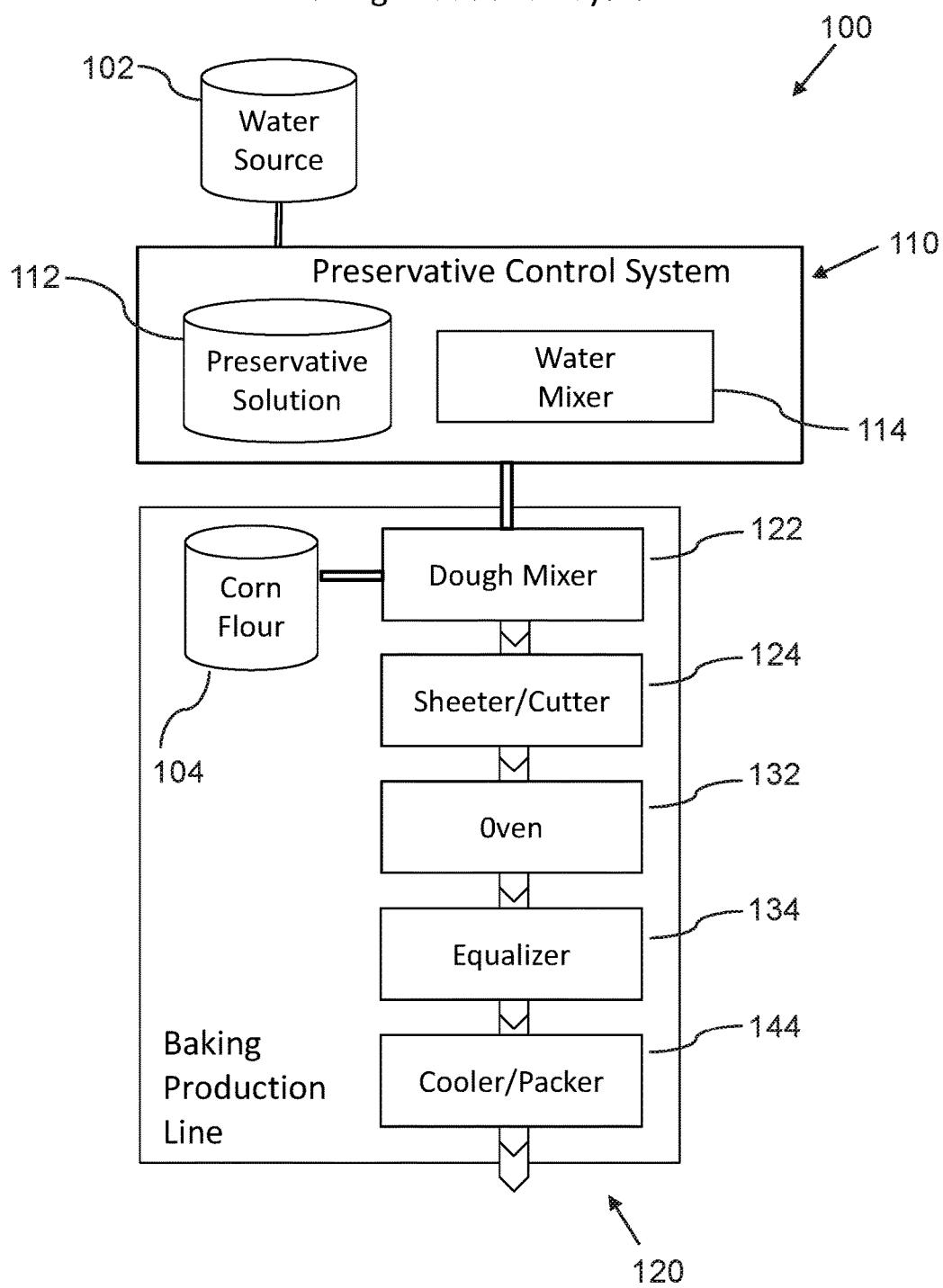
FIG. 1 is a schematic diagram illustrating a baking production system, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a production system 100 with reference to FIG. 1, in such manner that like reference numerals refer to like components throughout; a convention that we shall employ for the remainder of this specification.

In an embodiment, as shown in FIG. 1, a baking production system 100 for control of preservative concentration during production of baked products, including tortillas, can include:

a) a preservative control system 110, which can be configured to control mixing of water from a water source 102, such as public water, with a preservative solution 112, for use in baking production; and can further include:
   i. A water mixer 114, which is configured to mix the water with the preservative solution 112, thereby creating a water preservative mixture;
b) a production line 120, including:
   i. a dough mixer 122; which is configured to
      1. receive a baking mixture 104, which can be corn flour 104;
      2. mix the baking mixture with the water preservative mixture; thereby creating a dough, which for example can be a corn masa, a traditional corn dough used for tortilla production;
   ii. a sheeter/cutter 124, which is configured to:
      1. receive the masa from the dough mixer 122, via a cooker conveyer 113, which can be a pipe conveyer 113;
      2. form a sheet of the masa, which is kneaded, extruded and fed through sheeter rolls, to form a sheet;
      3. cutting pieces from the sheet of masa, such that the pieces are configured to be used for tortillas or other baked products, and can be cut in at least one predetermined shape;
   iii. an oven 132, which is configured to receive the pieces from the sheeter/cutter 124 via a sheeter conveyer, such that the pieces pass through the oven 132 on an internal conveyer, such that the pieces are baked when passing through the oven 132. The oven 132 can be gas fired, and the internal oven conveyer can be arranged in multiple sections, tiers, or levels, which for example can include three oven levels arranged at different heights in the oven 132;
   iv. an equalizer 134, which can also be called a proofer or cooler, which is configured to receive the baked pieces from the oven 132 via an oven conveyer, such that the equalizer 124 is configured to cool the baked pieces;
   v. A cooler/packaging machine 144, which is configured to receive the baked pieces from the equalizer 134, via an equalizer conveyer, such that the cooler/packaging machine 144 is configured to cool and pack the baked pieces.

In related embodiments, the production line may be configured according to need and production volume, such that smaller lines for example can use a batch mixer wherein dough/masa is manually fed to the sheeter 124, and may omit some components, such as for example the equalizer 134 and/or the cooler/packaging machine 144, according to well-known principles for design of baking production lines 120.

In a related embodiment, the preservative solution can include a composition of at least one or all of:
a) Propionic Acid (to Preserve Freshness);
b) Benzoic Acid (to Preserve Freshness);
c) Phosphoric Acid (Preservative); and/or
d) Other preservatives.

In a related embodiment, the preservative control system 110 can include:
a) a preservative control unit 202;
b) a flow control valve 212, which is connected to an external water source 102 that provides a flow of source water, which is pressurized, such that the flow control valve 212 is configured to regulate the flow of the source water based on a control signal from the preservative control unit 202;
c) a flow meter 214, which is connected to output from the flow control valve, such that the flow meter measures an actual water flow in the water flow line 210;
d) a first conductive probe 216, which is configured to measure a conductivity of the source water in communication with the preservative control unit;
e) a first pH Sensor 218, which is configured to measure an acidity of the source water in communication with the preservative control unit 202;
f) a metering pump 222, which is configured to pump a preservative solution via a preservative flow line 220, such that the preservative control unit 202 is connected to the metering pump 222, such that the preservative control unit is configured to control a preservative flow of the preservative solution 112;
g) a water mixer 114, which is in fluid connection with the water flow and preservative flow lines 210 220, such that the water mixer 114 is configured to mix the source water 102 with the preservative solution 112, thereby forming a flow of mixed water;
h) a second conductive probe 236, which is configured to measure a conductivity of the mixed water in communication with the preservative control unit 202;
i) a temperature sensor 238, which is configured to measure a temperature of the mixed water in communication with the preservative control unit 202;
j) a second pH Sensor 239, which is configured to measure an acidity of the mixed water in communication with the preservative control unit 202; and
k) a moisture sensor 242, which is configured to measure a moisture of the dough in communication with the preservative control unit.

In a further related embodiment, the flow control valve 212 and flow meter 214 can be replaced by other well-known methods of regulating liquid flow, such as for example using a variable pump with a flow meter, etc.

Figure 3:
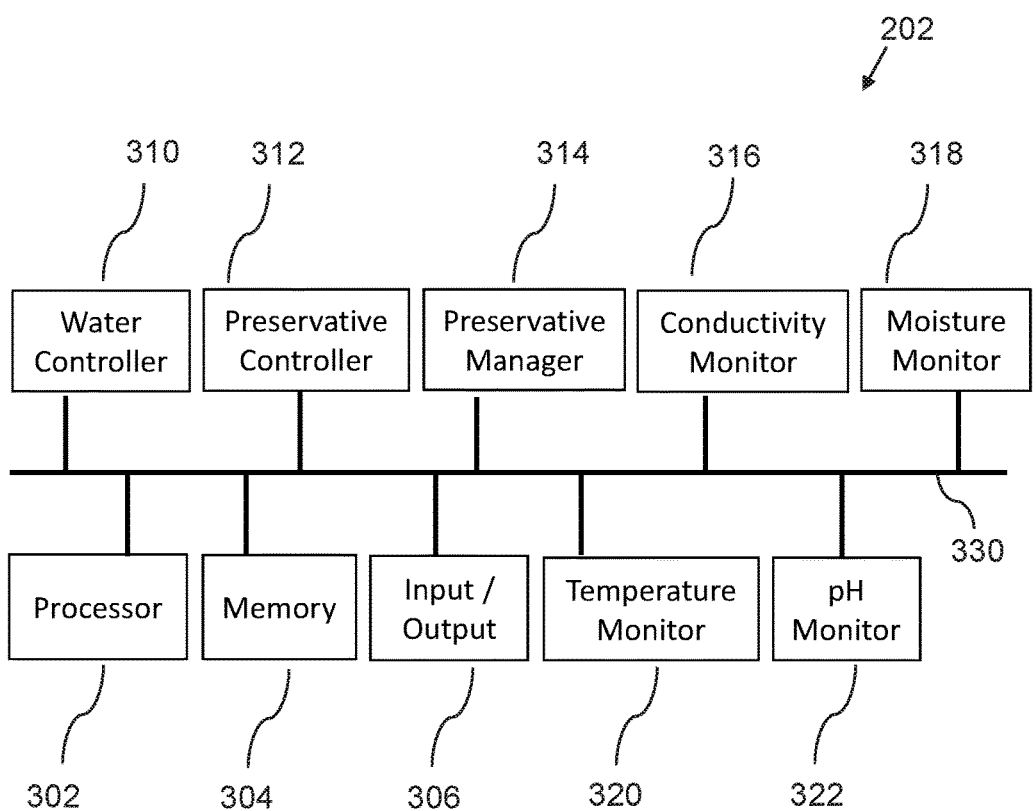
FIG. 3 is a schematic diagram illustrating a preservative control unit, according to an embodiment of the invention.

In a related embodiment, as shown in FIG. 3, a preservative control unit 202 can include:
a) A processor 302;
b) A non-transitory memory 304;
c) An input/output component 306;
d) A water controller 310, which can be configured to control the flow of source water by regulating the flow metering pump 222;
e) A preservative controller 312, which can be configured to control the flow of preservative solution by regulating the flow control valve 212;
f) A preservative manager 314, which can be configured to regulate a content of preservative in a dough, by:
   i. regulating a flow of preservative in communication with a preservative controller 312; and
   ii. regulating a flow of water in communication with the water controller 310;
g) A conductivity monitor 316, which can be configured to measure a conductivity of the source water in communication with the first conductive probe 216 and measure a conductivity of the mixed water in communication with the second conductive probe 236;
h) A moisture monitor 318, which can be configured to measure a moisture content of the dough in communication with the moisture sensor 242;
i) A temperature monitor 320, which can be configured to measure a temperature of the mixed water in communication with the temperature sensor 238; and j) A pH monitor 322, which can be configured to measure a pH of the source water in communication with the pH sensor #1 218 and a pH of the mixed water in communication with the pH sensor #2 239; all connected via k) A data bus 330;

wherein the preservative manager 314 can be configured to regulate the flow of water in communication with the water controller 310;

In a related embodiment, the preservative manager 314 can be configured to calculate a preservative concentration of the water preservative mixture by performing a differential calculation, $F_{dc}$, to determine a concentration of preservative, $Conc_{MW}$, in the mixed water, which is based on a calculation of the difference between measurements of a first conductivity of the source water and a second conductivity of the mixed water, such that $$Conc_{MW} = F_{dc}(C_1, C_2)$$

where
  i. $Conc_{MW}$ is the preservative concentration of the mixed water, for example measured in grams per liter;
  ii. $F_{dc}$ is a function representing the differential calculation; and
wherein the first and second conductivities, $C_1$ and $C_2$, are obtained in communication with respectively the first and second conductive probes 216 236.

In a further related embodiment, the differential calculation, $F_{dc1}$, can be defined by a calibration test of the baking production system 100, such that a number of test inputs are sampled to establish a calibration table that correlates sample points of first and second conductivities with resulting concentrations of preservative, such that the differential function is defined by the calibration table, for example such that the differential function be represented by a lookup in the calibration table or by a function smoothing over the calibration table, using well known methods for function fitting.

In a yet further related embodiment, the differential calculation can be enhanced to compensate for temperature, such that the calibration table is expanded to include test samples at a range of temperatures of the mixed water, such that for each temperature sample value is associated a set of sample points of first and second conductivities with resulting concentrations of preservative.

In a yet further related embodiment, the differential calculation can be enhanced to compensate for pH (i.e. acidity/alkalinity), such that the test samples are expanded to include testing at a range of acidities of the mixed water, such that for each acidity sample value is associated a set of sample points of first and second conductivities with resulting concentrations of preservative.

In related embodiment, the differential calculation can be enhanced to simultaneously compensate for temperature and pH, such that the calibration table is expanded with both temperature and pH parameter dimensions.

In another related embodiment, the preservative manager 314 can be configured to calculate a preservative concentration of the water preservative mixture by performing an acidity differential calculation, $F_{dc2}$, to determine a concentration of preservative, $Conc_{MW}$, in the mixed water, which is based on a calculation of the difference between measurements of a first acidity (pH) of the source water and a second acidity of the mixed water, such that $$Conc_{MW} = F_{dc2}(pH_1, pH_2)$$

where
  i. $Conc_{MW}$ is the preservative concentration of the mixed water, for example measured in grams per liter;
  ii. $F_{dc2}$ is a function representing the differential calculation; and
wherein the first and second acidities, $pH_1$ and $pH_2$, are obtained in communication with respectively the first and second pH sensors 218 239.

In another related embodiment, the acidity differential calculation, $F_{dc2}$, can be defined by a calibration test of the baking production system 100, such that a number of test inputs are sampled to establish a calibration table that correlates sample points of pH of the source water and pH of the mixed water with resulting concentrations of preservative, such that the differential function is defined by the calibration table, for example such that the differential function be represented by a lookup in the calibration table or by a function smoothing over the calibration table, using well known methods for function fitting.

In another related embodiment, the preservative manager 314 can further be configured to execute a first control loop feedback calculation to optimize the flow of preservative solution to reach a predetermined preservative target for preservative concentration of the mixed water.

In a further related embodiment, the first control loop feedback algorithm of the feedback controller can be a proportional-integral-derivative controller algorithm, such that:

$$u_{c\_mw}(t) = K_{p1}e_{c\_mw}(t) + K_{i1}\int e_{c\_mw}(t)dt + K_{d1}\frac{d}{dt}[e_{c\_mw}(t)]$$

where
  $u_{c\_mw}(t)$ is a control variable for control of the preservative flow of the metering pump 222;
  $e_{c\_mw}(t)$ is an error term for the current preservative concentration as compared to a preservative concentration set point, i.e. $e_{temp}(t)=SP(t)-PV(t)$;
  $K_{p1}$, $K_{i1}$, and $K_{d1}$ are tuning coefficients for respectively the proportional, integral, and derivative terms.

In other further related embodiments, the first control loop feedback calculation can be based on a custom developed control loop feedback algorithm, which can include modern well-known control algorithms in the categories of linear, nonlinear, and stochastic systems control algorithms.

In a related embodiment, the preservative manager 314 can be configured to calculate a preservative concentration of the dough by performing a concentration calculation, $F_{cc}$, to determine a concentration of preservative, $Conc_{Dough}$, of the dough, as a function of the concentration of preservative, $Conc_{MW}$, in the mixed water and a moisture of the dough, $M_{Dough}$, such that:

$$Conc_{Dough} = F_{cc}(Conc_{MW}, M_{Dough});$$

wherein the moisture of the dough is obtained in communication with the moisture sensor 242.

In a further related embodiment, the second calculation, $F_{dc2}$, can be defined by a calibration test of the baking production system 100, such that a number of test inputs are sampled to establish a second calibration table that correlates sample points of concentration of preservative, $Conc_{MW}$, in the mixed water and a moisture of the dough, $M_{Dough}$, with resulting concentrations of preservative in the dough, $Conc_{Dough}$. $F_{dc}$ can then be represented by a lookup in the calibration table or by a function smoothing over the calibration table, using well known methods for function fitting of multi-dimensional data samples. Such function fitting can for example be calculated by using a plurality of well-known methods, for example from the areas of machine learning, function approximation, and curve fitting, including:

a) Calculating the concentration function by configuring the concentration function as an artificial neural network, and training the artificial neural network on the second calibration table;

b) Calculating the concentration function by least-square function approximation to match the second calibration table.

In another related embodiment, the preservative manager 314 can further be configured to execute a second control loop feedback calculation to optimize the flow of the source water to reach a predetermined moisture target for moisture of the dough.

In a further related embodiment, the second control loop feedback algorithm of the feedback controller can be a proportional-integral-derivative controller algorithm, such that:

$$u_{c\_sw}(t) = K_{p2}e_{c\_sw}(t) + K_{i2}\int e_{c\_sw}(t)dt + K_{d2}\frac{d}{dt}[e_{c\_sw}(t)]$$

where $u_{c\_sw}(t)$ is a control variable for control of the flow control valve 212 to control the flow of source water in the water flow line 210;

$e_{c\_sw}(t)$ is an error term for the current water flow (measured by the flow meter 214) as compared to a water flow set point, i.e. $e_{c\_sw}(t)=SP(t)-PV(t)$; $K_{p2}$, $K_{i2}$, and $K_{d2}$ are tuning coefficients for respectively the proportional, integral, and derivative terms.

In other further related embodiments, the second control loop feedback calculation can be based on a custom developed control loop feedback algorithm, which can include modern well-known control algorithms in the categories of linear, nonlinear, and stochastic systems control algorithms.

In a related embodiment, the moisture sensor 242 can be a reflection absorption moisture sensor.

In a related embodiment, the moisture sensor 242 can be a time-domain reflectometry moisture sensor, which analyzes propagation of radar waves (i.e. electromagnetic radiation) to determine relative permittivity (i.e. dielectric constant) and thereby determine moisture content. The moisture sensor 242 can for example be a Sono-Vario moisture probe manufactured by IMKO Micromodultechnik GmbH.

In further related embodiments, the preservative manager 314 can be configured to execute the first and second control loop feedback calculations independently/separately, in sequence, and/or in parallel.

In a further related embodiment, the preservative manager 314 can be configured to issue an alarm upon exceeding predetermined thresholds for high or low preservative concentration of the dough, thereby avoiding wasting of the product.

In a further related embodiment, the preservative manager 314 can be configured to measure a temperature of mixed water and/or dough in order to correct for temperature effects.

In an embodiment, as illustrated in FIG. 4, a method for preservative concentration control 400 for use during baking, can include:

a) Calculating water preservative concentration 402, comprising calculating a preservative concentration of the water preservative mixture by performing a differential calculation, $F_{dc}$, to determine a concentration of preservative, $Conc_{MW}$, in the mixed water, as a function of measurements of a first conductivity of the source water and a second conductivity of the mixed water;

b) Optimizing preservative solution flow 404, comprising executing a first control loop feedback calculation to optimize the flow of preservative solution to reach a predetermined preservative target for preservative concentration of the mixed water;

c) Calculating dough preservative concentration 406, comprising calculating a preservative concentration of the dough by performing a concentration calculation, $F_{cc}$, to determine a concentration of preservative, $Conc_{Dough}$, of the dough, as a function of the concentration of preservative, $Conc_{MW}$, in the mixed water and a moisture of the dough, $M_{Dough}$;

d) Optimizing source water flow 408, comprising executing a second control loop feedback calculation to optimize the flow of the source water to reach a predetermined moisture target for moisture of the dough;

e) Cutting and Baking 410, comprising forming a sheet of the dough and cutting the sheet into pieces, and baking the pieces in an oven.

In a further related embodiment, calculating water preservative concentration 402 can further include that the differential calculation can be enhanced to compensate for temperature, such that the calibration table is expanded to include test samples at a range of temperatures of the mixed water, such that for each temperature sample value is associated a set of sample points of first and second conductivities with resulting concentrations of preservative.

In another further related embodiment, calculating water preservative concentration 402 can further include that the differential calculation can be enhanced to compensate for pH (i.e. acidity/alkalinity), such that the test samples are expanded to include testing at a range of acidities of the mixed water, such that for each acidity sample value is associated a set of sample points of first and second conductivities with resulting concentrations of preservative.

FIGS. 1, 2, 3, and 4 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

Figure 2:
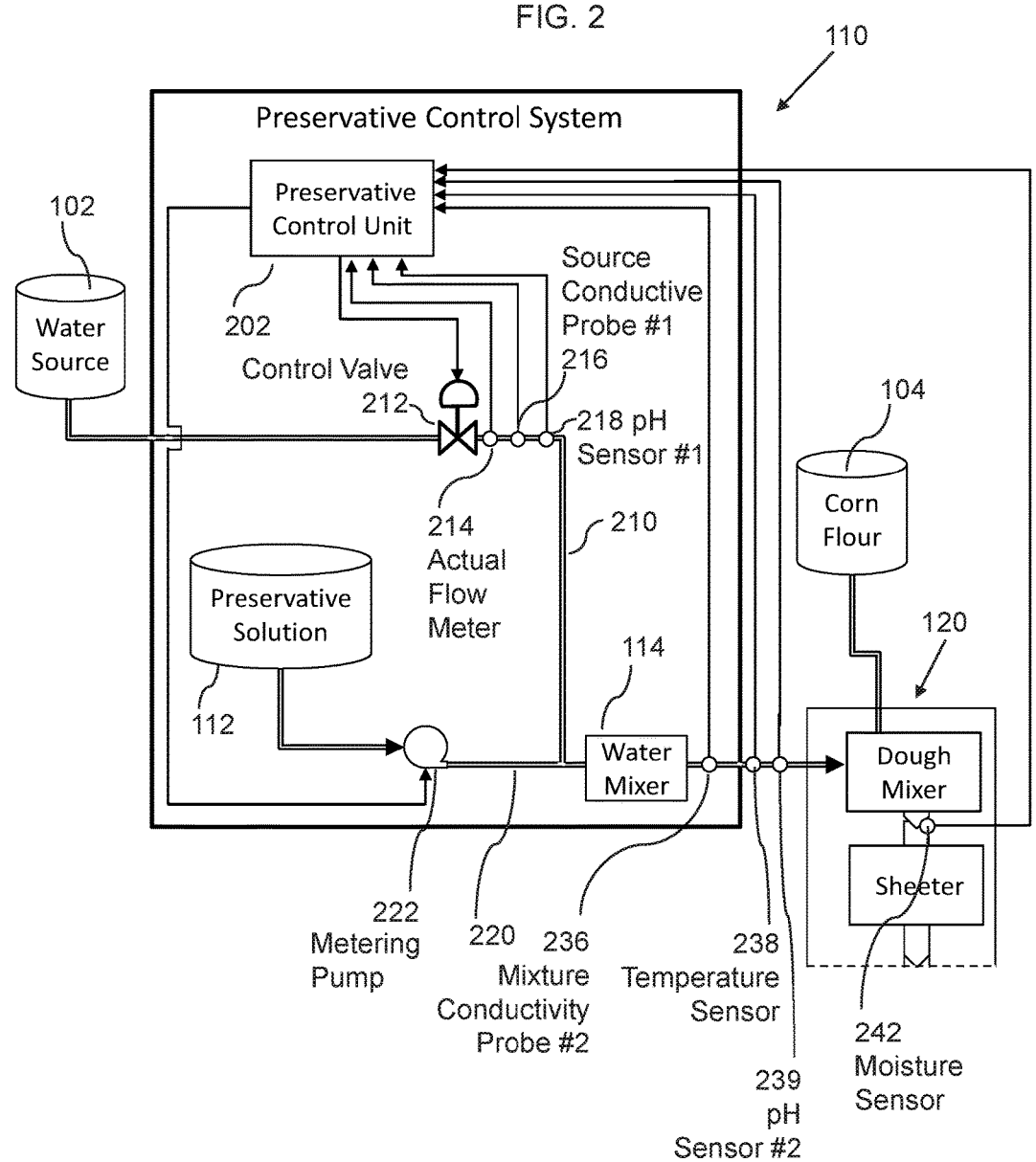
FIG. 2 is a schematic diagram illustrating a preservative control system, according to an embodiment of the invention.

In this regard, FIGS. 1, 2, and 3 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

It shall be understood that the above-mentioned components of the preservative control unit 202 are to be interpreted in the most general manner.

For example, the processor 302 can include a single physical microprocessor or microcontroller, a cluster of processors, a datacenter or a cluster of datacenters, a computing cloud service, and the like.

In a further example, the non-transitory memory 304 can include various forms of non-transitory storage media, including random access memory and other forms of dynamic storage, and hard disks, hard disk clusters, cloud storage services, and other forms of long-term storage. Similarly, the input/output 306 can include a plurality of well-known input/output devices, such as screens, keyboards, pointing devices, motion trackers, communication ports, and so forth.

Furthermore, it shall be understood that the preservative control unit 202 can include a number of other components that are well known in the art of general computer devices, and therefore shall not be further described herein. This can include system access to common functions and hardware, such as for example via operating system layers such as Windows, Linux, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the preservative control unit 202 can communicate with sensors, pumps, valves, and gauges in the preservative control system 110 and the baking production line 120 over a network, which can include the general Internet, a Wide Area Network or a Local Area Network, or another form of communication network, transmitted on wired or wireless connections. Wireless networks can for example include Ethernet, Wi-Fi, Bluetooth, ZigBee, cellular networks (including 3G, 4G, and 5G networks), and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, such as for example implemented via a field-programmable gate array (FPGA), or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the baking production system 100, and devices, components, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A baking production system for control of preservative concentration during production of baked products, comprising:
 a) a preservative control system, which is configured to control mixing of water from a water source with a preservative solution; the preservative control system comprising:
  a water mixer, which is configured to mix the water with the preservative solution, thereby creating a water preservative mixture;
  a preservative control unit;
  a flow control valve, which is configured to be connected to an external water source that provides a flow of source water, such that the flow control valve is configured to regulate a source water flow of the source water based on a control signal from the preservative control unit;

a flow meter, which is connected to output from the flow control valve, such that the flow meter measures an actual water flow in the water flow line;

a metering pump, which is configured to pump a preservative solution via a preservative flow line, such that the preservative control unit is connected to the metering pump, such that the preservative control unit is configured to control a preservative flow of the preservative solution;

a water mixer, which is in fluid connection with the water flow and preservative flow lines, such that the water mixer is configured to mix the source water with the preservative solution, thereby forming a flow of mixed water; and a moisture sensor, which is configured to measure a moisture of the dough in communication with the preservative control unit; and b) a production line, comprising:
a dough mixer, which is configured to receive a baking mixture and mix the baking mixture with the water preservative mixture, thereby creating a dough.

2. The baking production system of claim 1, wherein the preservative control system further comprises the preservative solution, wherein the preservative solution is selected from the group consisting of:
a) propionic acid;
b) benzoic acid;
c) phosphoric acid; and
d) combinations thereof.

3. The baking production system of claim 1, wherein the moisture sensor is a reflection absorption moisture sensor.

4. The baking production system of claim 1, wherein the moisture sensor is a time-domain reflectometry moisture sensor, which is configured to analyze propagation of electromagnetic radiation to determine relative permittivity.

5. The baking production system of claim 1, wherein the preservative control unit further comprises:
a) a processor;
b) a non-transitory memory;
c) an input/output component;
d) a water controller, which is configured to control the flow of source water by regulating the flow metering pump;
e) a preservative controller, which is configured to control the flow of preservative solution by regulating the flow control valve;
f) a preservative manager, which is configured to regulate a content of preservative in a dough, such that:
the preservative manager is configured to regulate a flow of preservative in communication with the preservative controller; and
the preservative manager is configured to regulate a flow of water in communication with the water controller; and
g) a moisture monitor, which is configured to measure a moisture content of the dough in communication with the moisture sensor; all connected via h) a data bus.

6. The baking production system of claim 5, wherein:
a) the preservative control system further comprises:
a first acidity sensor, which is configured to measure an acidity of the source water; and
a second acidity sensor, which is configured to measure an acidity of the mixed water; and b) the preservative control unit further comprises an acidity monitor, which is configured to:
measure a first acidity of the source water in communication with the first acidity sensor; and
measure a second acidity of the mixed water in communication with the second acidity sensor;
wherein the preservative manager is configured to calculate a preservative concentration of the water preservative mixture by performing a differential calculation to determine a concentration of preservative in the mixed water, which is based on a calculation of the difference between measurements of a first acidity of the source water and a second acidity of the mixed water.

7. The baking production system of claim 6, wherein the differential calculation is defined by a calibration test of the baking production system, such that a number of test inputs are sampled to establish a calibration table that correlates sample points of first and second acidities with resulting concentrations of preservative in the mixed water, such that the differential function is defined by the calibration table.

8. The baking production system of claim 7, wherein the preservative manager is configured to calculate a preservative concentration of the dough by executing a concentration calculation to determine a concentration of preservative of the dough, as a function of the concentration of preservative in the mixed water and a moisture of the dough, wherein the moisture of the dough is obtained in communication with the moisture sensor.

9. The baking production system of claim 1, wherein:
a) the preservative control system further comprises:
a first conductive probe, which is configured to measure a conductivity of the source water in communication with the preservative control unit; and
a second conductive probe, which is configured to measure a conductivity of the mixed water in communication with the preservative control unit; and
b) the preservative control unit further comprises:
a conductivity monitor, which is configured to measure a conductivity of the source water in communication with the first conductive probe and measure a conductivity of the mixed water in communication with the second conductive probe.

10. The baking production system of claim 9, wherein the preservative manager is configured to calculate a preservative concentration of the water preservative mixture by performing a differential calculation to determine a concentration of preservative in the mixed water, which is based on a calculation of the difference between measurements of a first conductivity of the source water and a second conductivity of the mixed water.

11. The baking production system of claim 10, wherein the differential calculation is defined by a calibration test of the baking production system, such that a number of test inputs are sampled to establish a calibration table that correlates sample points of first and second conductivities with resulting concentrations of preservative in the mixed water, such that the differential function is defined by the calibration table.

12. The baking production system of claim 11, wherein the differential function is represented as a lookup in the calibration table.

13. The baking production system of claim 11, wherein:
a) the preservative control system further comprises a temperature sensor, which is configured to measure a temperature of the mixed water; and b) the preservative control unit further comprises a temperature monitor, which is configured to measure a temperature of the mixed water in communication with the temperature sensor;

wherein the differential function is enhanced to compensate for temperature, such that the calibration table is expanded to include test samples at a range of temperatures of the mixed water, such that for each temperature sample value is associated a set of sample points of first and second conductivities with resulting concentrations of preservative.

14. The baking production system of claim 11, wherein:
a) the preservative control system further comprises an acidity sensor, which is configured to measure an acidity of the mixed water; and
b) the preservative control unit further comprises an acidity monitor, which is configured to measure an acidity of the mixed water in communication with the temperature sensor;

wherein the differential function is enhanced to compensate for acidity, such that the test samples are expanded to include testing at a range of acidities of the mixed water, such that for each acidity sample value is associated a set of sample points of first and second conductivities with resulting concentrations of preservative.

15. The baking production system of claim 11, wherein the preservative manager is further configured to execute a first control loop feedback calculation to optimize the flow of preservative solution to reach a predetermined preservative target for preservative concentration of the mixed water.

16. The production system of claim 15, wherein the first control loop feedback algorithm is a proportional-integral-derivative controller algorithm.

17. The baking production system of claim 10, wherein the preservative manager is configured to calculate a preservative concentration of the dough by executing a concentration calculation to determine a concentration of preservative of the dough, as a function of the concentration of preservative in the mixed water and a moisture of the dough, wherein the moisture of the dough is obtained in communication with the moisture sensor.

18. The baking production system of claim 17, wherein the concentration calculation is defined by a second calibration test of the baking production system, such that a second number of test inputs are sampled to establish a second calibration table that correlates sample points of concentration of preservative in the mixed water and a moisture of the dough with resulting concentrations of preservative in the dough, such that the concentration function is defined by the second calibration table.

19. The baking production system of claim 18, wherein the concentration function is represented as a lookup in the second calibration table.

20. The baking production system of claim 18, wherein the preservative manager is further configured to execute a second control loop feedback calculation to optimize the flow of the source water to reach a predetermined moisture target for moisture of the dough.

21. The production system of claim 20, wherein the second control loop feedback algorithm is a proportional-integral-derivative controller algorithm.

22. The production system of claim 20, wherein the feedback controller is configured to execute the first and second control loop feedback calculations in parallel.

* * * * *